No. 77,822.  
T. J. LEIGH.  
FURNACE FOR BURNING FUEL FOR HEATING METALS AND FOR OTHER PURPOSES.

PATENTED MAY 12, 1868.

2-SHEETS—SHEET 1

Witnesses:

Inventor:

No. 77,822. PATENTED MAY 12, 1868.
T. J. LEIGH.
FURNACE FOR BURNING FUEL FOR HEATING METALS AND FOR OTHER PURPOSES.
2 SHEETS—SHEET 2.
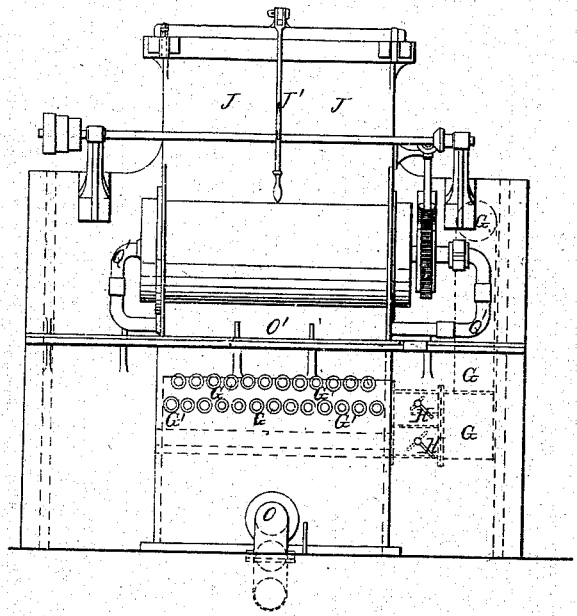
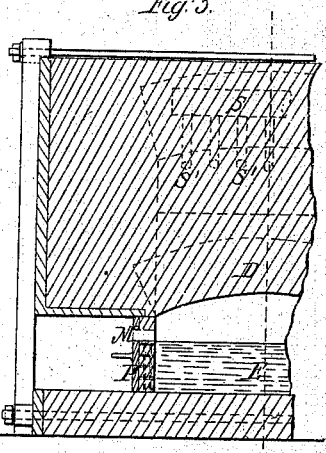
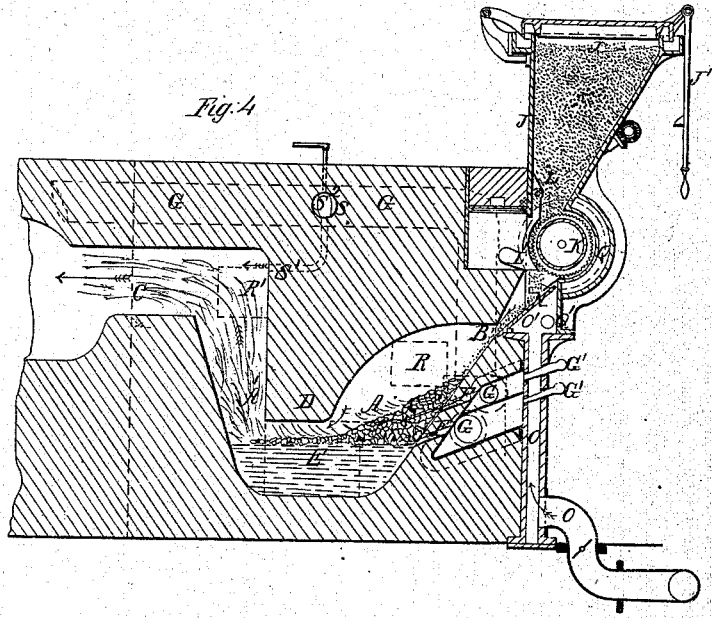

United States Patent Office.

THOMAS JOSEPH LEIGH, OF LONDON, ENGLAND.

Letters Patent No. 77,822, dated May 12, 1868.

IMPROVEMENT IN FURNACES FOR BURNING FUEL FOR HEATING METALS, AND FOR OTHER PURPOSES.

*The Schedule referred to in these Letters Patent and making part of the same.*

TO ALL WHOM IT MAY CONCERN:

Be it known that I, THOMAS JOSEPH LEIGH, of London, in the county of Middlesex, and Kingdom of England, have invented new and useful Improvements in Furnaces, and in Effecting the Combustion of Fuel therein; and I do hereby declare that the following is a full, clear, and exact description thereof, which will enable those skilled in the art to make and use the same, reference being had to the accompanying drawings, forming part of this specification.

My improvements in furnaces, and in effecting the combustion of fuel therein, are to be understood from the following description, reference being had to the accompanying drawings, and to the letters and figures marked thereon.

I form a chamber, lined with fire-brick or other refractory substance, which chamber is closed in or arched over, except at two places, on opposite sides, where apertures are formed, the one for supplying fuel, and the other for the exit of the flames.

This latter aperture leads to the bed of a puddling, heating, or melting-furnace, or to the working-chamber of any reverberatory furnace, cupola, or blast-furnace, or around the sides, or through the tubes or flues of a boiler, where the heat is utilized.

The chamber is formed with a partition, diaphragm, or hanging bridge, which descends from the crown or roof of the chamber to a certain distance from the bottom.

Molten metal, slag, or glass, or metal covered by molten slag or glass, occupies the bottom of the chamber to a level of a few inches below the partition or diaphragm.

The chamber is thus separated into two compartments, communicating with one another through the passage between the lower edge of the diaphragm and the surface of the molten matters.

The side of the first, or feeding-compartment, is either vertical or inclined, and through this side I introduce a blast of air from a fan or other blowing-apparatus.

This may enter by one tuyere, but I prefer to make it enter by numerous small tuyeres, at suitable levels.

At the top of this compartment I place a fuel-hopper, whence, by suitable mechanism, the fuel is passed, as required for combustion, into a chute, and made to fall upon an inclined metal plate, and thence into the chamber.

A stream of cold air is made to play upon the surface of the inclined plate, so as to keep it cool and assist the descent of the fuel into the feeding-compartment.

The fuel, in descending through the compartment, is mixed with the air entering by the tuyeres, and, being kindled, a continuous sheet of flame is thus made to pass over the surface of the molten matter into the other compartment of the chamber, whence it issues to the furnace with which it is connected.

I prefer to use heated air for the lower row of tuyeres, as it tends to keep the bed or bath of molten matter fluid, which renders combustion complete.

When coke in lumps, or anthracite coal, peat, wood, or charcoal is used as fuel, the hopper and mechanism for feeding may be dispensed with, and the furnace may be fed by hand, through a small door in the feeding-compartment.

As the ash or refuse of the fuel fuses into a slag, after the furnace has been working some time the level of the molten matter is raised.

I therefore provide a tapping-hole, at a proper level, so that I can draw off a little of the slag from time to time.

The construction of furnace and method of burning fuel which I have described are applicable to those operations in the arts and manufactures where high temperatures are required, such as for melting metals, smelting ores, generating steam, evaporating liquids, or for the manufacture of glass, porcelain, and earthenware.

Figure 1, sheet 1, is a side elevation of a furnace constructed according to my invention.

Figure 2 is a sectional plan of the same.

Figure 3, sheet 2, is a front elevation.

Figure 4 is a longitudinal vertical section.

Figure 5 is part of a transverse section.

Similar letters of reference indicate corresponding parts.

Figure 1:
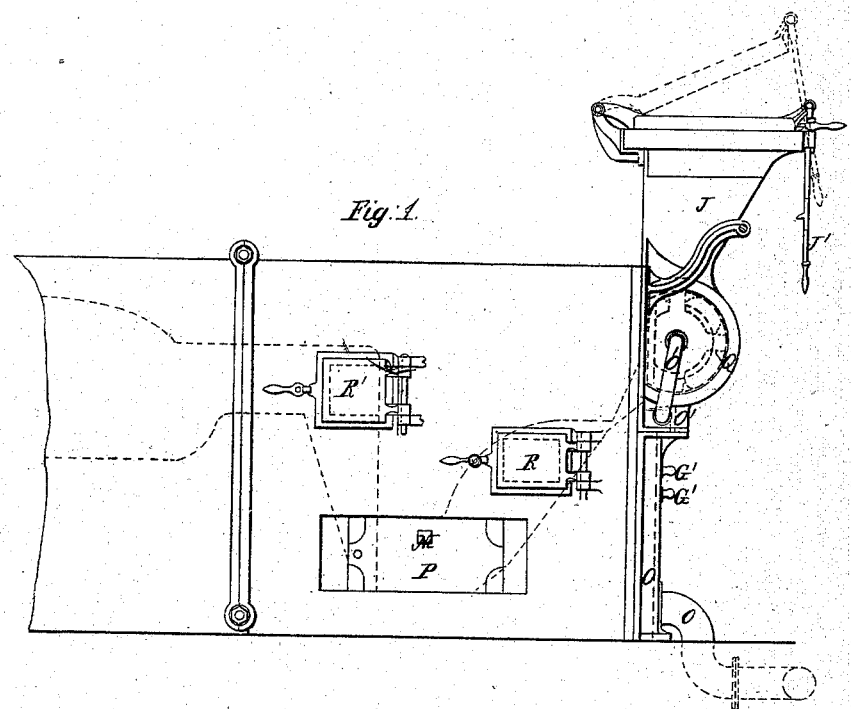
Figure 2:
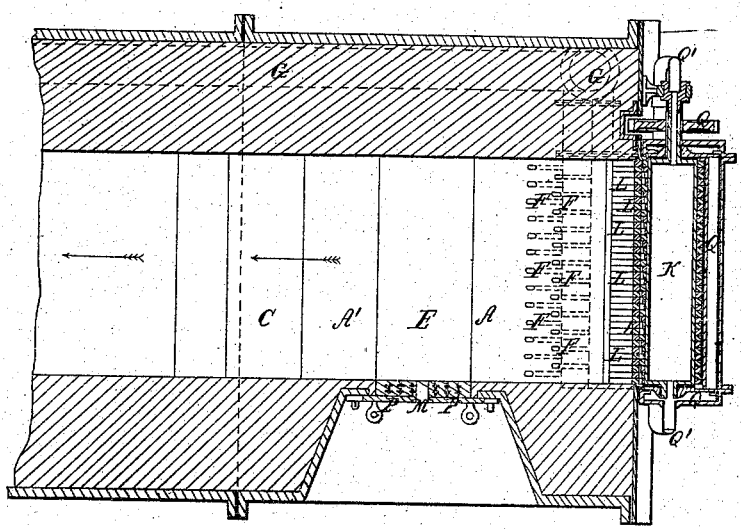

A A' is a chamber lined with fire-brick or other refractory material.

B is a slit or aperture through which fuel is fed into the chamber A.

C is the aperture for the exit of the flames which may lead to the bed of a puddling, reheating, or melting-furnace, or to the working-chamber of any reverberatory furnace, cupola, or blast-furnace, or around the sides, or through the tubes, or flues of a boiler, where the heat is utilized.

D is a partition, or diaphragm, or hanging bridge, dividing the chamber into two compartments, A and A'.

E is a bed of molten matter, which may be metal, slag, or glass, or metal covered by molten slag, or molten glass, or a solid metal bed so covered.

F F are tuyeres passing through the sides of the chamber A, and supplied with air from a fan or other blowing-apparatus.

I prefer that the air admitted to these chambers should be heated, and this may be done by passing it through pipes in the chimney, and conducting it by the pipe G to the tuyeres F F, its admission to which is regulated by valves H H.

J is a fuel-hopper, covered by a lid, which has a rim resting in a sand bed, round the upper edges of the hopper, so that, when closed, it is air-tight, or nearly so, and which can be raised by the handle J'.

K is a hollow cylinder, having a fluted surface, the flutes running in a slightly helical direction from end to end.

The cylinder is made to revolve slowly by hand or by engine-power, communicated to it through the gearing represented on the drawing or other suitable mechanism.

L is a round bar or bolt, on which a series of pawls, L', is strung, side by side, free to vibrate thereon.

These pawls are heavy, and are so hung upon the bar L that their surfaces can lean against the cylinder K, and thus prevent the fuel-dust contained in the hopper J from passing down into the feeding-compartment A, except the quantity which fills the flutes of the revolving cylinder K.

M is a tapping-hole, through which the fused ash or earthy impurities of the fuel can be drawn off, from time to time, when its level rises above that of the tap-hole.

N is an inclined plate, on which the fuel falls from the cylinder K.

O is a pipe, fitted with a regulating-valve, by which a current of cold air enters the chamber O', escaping from it over the upper edge of the plate N, blowing through a narrow slit over the upper surface of the same, and finally passing, with the fuel, through the aperture B.

This blast keeps the plate N cool, and assists the fuel in its descent into the feeding-compartment A.

P is a door, faced with refractory material, by which access can be obtained, when necessary, to the bed of the chamber A, for cleaning or repairs.

Q is an air-casing surrounding the cylinder, supplied with cold air from the air-chamber O' by the pipes Q' Q'.

I prefer to make the trunnions of the cylinder K hollow, and to convey the cold blast, also, through it, so that the various parts of the feeding-apparatus can be kept cool, and thereby the generation of gas and the caking or coking of fuel in the hopper prevented.

G' G' are plugs for clearing the tuyeres.

The action of the apparatus is as follows:

The hoppers being supplied with fuel, and the lid or cover shut close, the chamber A is supplied with a quantity of burning fuel, (preferably in a state of incandescence,) through a small door, R, at the side thereof.

The blast is then gently turned on through the tuyeres F F, so that the fuel burns freely, and heats the lining of the chamber A.

Fuel is also admitted through another side-door, R', until the chamber A' is filled to that level, and the whole of the fuel is brought to a high state of ignition.

A charge of cast iron, broken small, is then introduced through the door R', along with a small quantity of chalk or lime, or other fluxing-matter, to assist in forming slag.

The blast is then increased, so that the iron and slag are fused, and this is continued till the slag begins to flow through the tap-hole M.

Or, instead of using iron or running a slag in the furnace, slag may be supplied in small pieces through the door R', or a composition of sand, lime, and such like matter, well mixed with a little moisture, and made into balls or lumps, can be introduced, after being thoroughly dried, or broken glass may be added, or common red ore.

When the metal or slag is fused, and the fuel originally introduced is nearly consumed, the feeding-apparatus is put into action, and the fuel, passing down between the cylinder K and pawls L' L', falls on the inclined plate N, and is injected into the chamber A, little, however, passing into the compartment A'.

The fuel, in descending through the chamber A, is mixed with the air entering through the tuyeres F F, and a continuous sheet of flame is thus made to pass over the surface of the molten matter into the compartment A', whence it issues to the furnace, with which it may be connected.

After the furnace is put into operation, I introduce from time to time a flux, to assist in fusing the ash and other earthy impurities in the fuel.

Lime, limestone, chalk, or oyster-shells answer this purpose.

After the furnace has been working for some time, should the slag become tough and tenacious, or inclined to be hard, or chill, a little alkali may be added, or other matters suitable for making it more fluid, or a little fresh slag.

The material to flux the ash and earthy impurities of the fuel may be introduced through the door or into the hopper with the fuel, in proportionate quantity, and mixed throughout it.

The action of the furnace is controlled by means of the valves which admit the air, and by change-pulleys or other mechanism for adjusting the speed of the feeding-apparatus.

In order that no carbonic oxide or other inflammable gas, or particles of fuel, may escape without receiving their full supply of oxygen or air, a pipe or air-box, S, fitted with a valve, $S^2$, admits air from the hot-air piping through several tuyeres, $S^1$ $S^1$, at the top of the compartment A', so as to meet the gases or other inflammable matters as they rise in the up-take.

Having thus described the nature of my invention, and in what manner the same is to be performed, I would have it understood that I do not limit myself to the details represented in the drawings; but

I claim the combination of fuel in a bed of molten matter, and the construction and working of furnaces adapted to this purpose, as herein described.

The above specification of my invention signed by me, this fourth day of February, 1868.

THOMAS JOSEPH LEIGH.

Witnesses:
    ALEX'R P. WRIGHT,
    RD. CROCKER.